United States Patent [19]

Koller et al.

[11] 4,327,999
[45] May 4, 1982

[54] DISPERSE DYE STABLE TO DYEING, AND ITS USE FOR DYEING SYNTHETIC AND SEMI-SYNTHETIC FIBRE MATERIALS

[75] Inventors: Stefan Koller, Ramlinsburg; Peter Eugster, Arlesheim; Suresh C. Agarwal, Bottmingen, all of Switzerland

[73] Assignee: Ciba-Geigy Corporation, Ardsley, N.Y.

[21] Appl. No.: 221,596

[22] Filed: Dec. 31, 1980

[30] Foreign Application Priority Data

Jan. 9, 1980 [CH] Switzerland ............ 133/80

[51] Int. Cl.³ ............................................. D06P 67/02
[52] U.S. Cl. ........................................... 8/526; 8/524; 8/616; 8/662; 260/207.5; 260/208
[58] Field of Search ............... 8/524, 526, 662, 616; 260/208

[56] References Cited

U.S. PATENT DOCUMENTS

| | | | |
|---|---|---|---|
| 2,007,382 | 7/1935 | Ockman et al. | 8/526 |
| 3,963,431 | 6/1976 | Koller et al. | 8/695 |
| 4,074,965 | 2/1978 | Kruse et al. | 8/662 |
| 4,152,114 | 5/1979 | Koller et al. | 8/662 |

FOREIGN PATENT DOCUMENTS 2536052 2/1977 Fed. Rep. of Germany .
1543316 4/1979 United Kingdom .

*Primary Examiner*—A. Lionel Clingman
*Attorney, Agent, or Firm*—Edward McC. Roberts

[57] ABSTRACT

It is possible by heating at temperatures of between 65° and 200° C. to convert the known α-modification of the azo dye of the formula

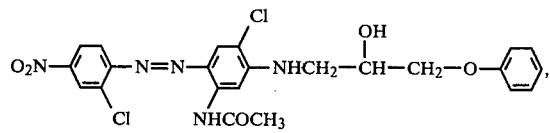

which is unstable to dyeing, completely into the β-modification which is stable to dyeing. The modification transformation can be performed either with the solid dye or with a suspension thereof in an organic, preferably aromatic, solvent.

The novel dye modification is stable in dispersion under dyeing conditions, and shows no tendency to flocculate.

7 Claims, 2 Drawing Figures

DISPERSE DYE STABLE TO DYEING, AND ITS USE FOR DYEING SYNTHETIC AND SEMI-SYNTHETIC FIBRE MATERIALS

The present invention relates to a novel crystallographic modification of the azo dye of the formula

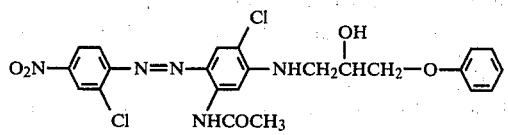

which is stable to dyeing and which is characterised by the X-ray diffraction pattern with the characteristic reflexes, taken with CuK-α radiation and shown in FIG. 1, and by the d values of the interplanar spacings, calculated from the diffraction pattern, whereby in the following only the lines of very strong (vs) and strong (s) relative intensity are taken into account:

d [Å]: 11.9 (s), 7.2 (vs), 3.61 (vs) and 3.39 (vs).

Figure 2:
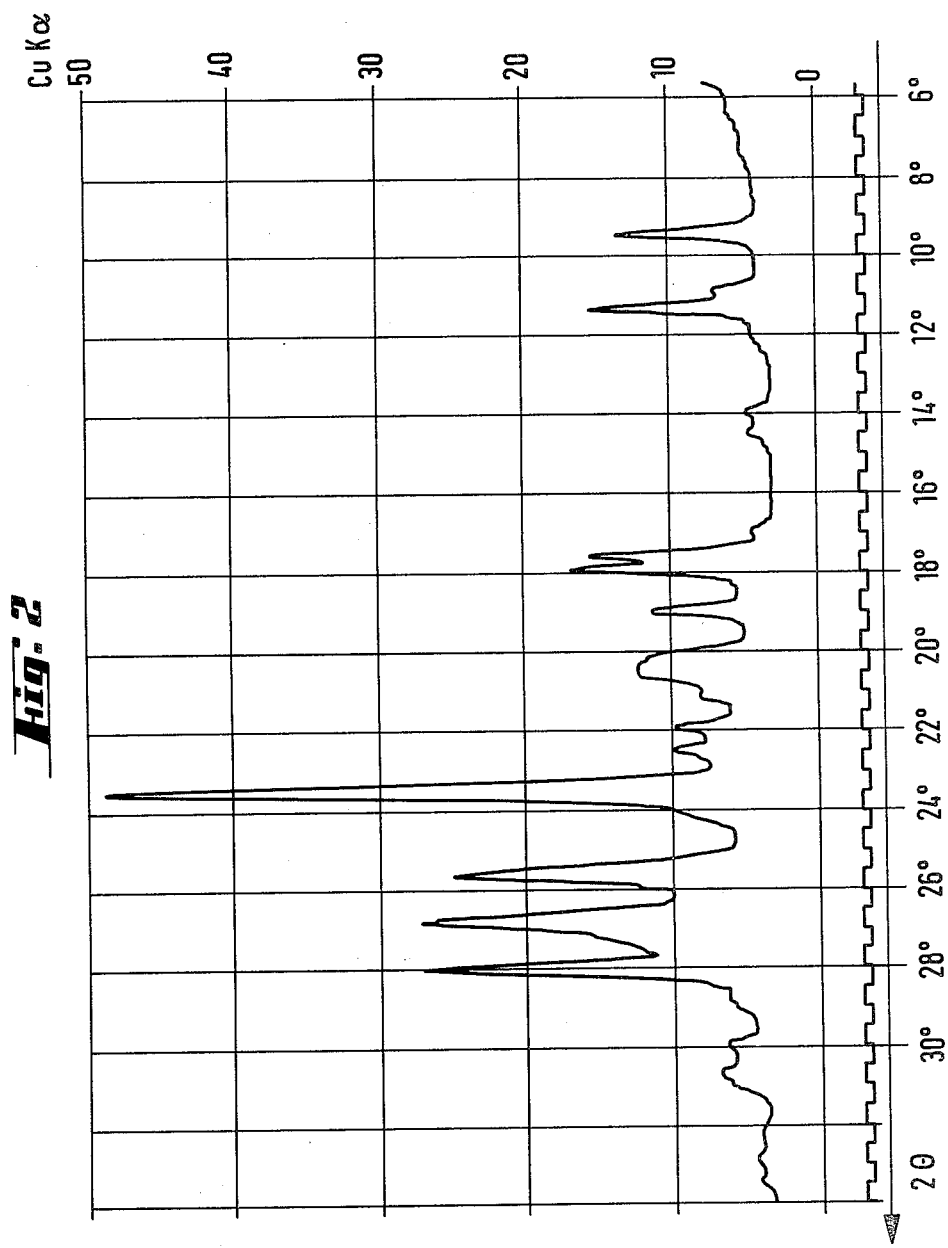

A known modification of the dye of the aforementioned formula is that which is designated in the following as the α-modification, and which is characterised by the X-ray diffraction pattern shown in FIG. 2, and by the following d values of the interplanar spacings:

d [Å]: 9.5 (s), 7.9 (s), 5.10 (s), 5.00 (s), 3.79 (vs), 3.48 (s), 3.34 (s) and 3.19 (s).

The dye is known as a disperse dye for dyeing and printing textile material, especially polyester fibre material.

The dye can be produced, using the process given in the German Pat. No. 2,101,912, by coupling diazotised 2-chloro-4-nitroaniline and 1-[N-(β-hydroxy-γ-phenoxypropyl)-amino]-2-chloro-5-acetylaminobenzene. The known modification obtained in this manner is not sufficiently stable to dyeing under the conditions prevailing in the dye liquor.

The novel modification stable to dying of the present invention, designated in the following as the β-modification, is obtained by heating the α-modification as such, advantageously in vacuo or suspended in a virtually water-free organic solvent, preferably for a period of 0.5 to 20 hours at temperatures of 65° to 200° C. It is advantageous to heat the dye in solid form for 4 to 12 hours at a temperature of 100° to 170° C., or in the form of a suspension in organic solvents, optionally under pressure, for 0.5 to 5 hours at 90° to 140° C.

The starting material is advantageously the moist press cake of the α-modification, as is obtained in the production of the dye after coupling; or alternatively the moist press cake is dried beforehand in vacuo at a temperature of 20° to 50° C.

A modification transformation in aqueous media, for example as a result of direct heating of the coupling suspension, surprisingly does not occur in the case of this dye.

The transformation can be easily traced by determination of melting points or by the taking of X-ray diffraction patterns.

Suitable organic solvents according to the invention are in particular water-immiscible, especially aromatic solvents having a boiling range of 70° to 220° C. Those which may be mentioned particularly are: carbon tetrachloride, chloroform and above all chlorobenzene, o-dichlorobenzene, toluene, xylene or nitrobenzene. Also suitable are high-molecular polyalkylene glycols, for example polyethylene glycol 6000.

The novel β-modification stable to dyeing can be obtained for example by heating for 4 to 12 hours the α-modification, which is unstable to dyeing, as solid dye at temperatures between 65° and 200° C., preferably between 100° and 170° C., advantageously in vacuo.

It is possible to convert the α-modification, which has been firstly pre-dried for example for 1 to 2 days at room temperature, into the β-modification also by heating it as a suspension in a practically water-free apolar organic solvent, advantageously in an aromatic solvent, such as chlorobenzene, for 0.5 to 5 hours at temperatures of between 65° and 200° C., preferably between 90° and 140° C. The heating of the suspension is carried out optionally under pressure. Examples which may be mentioned are: 4 hours' heating in carbon tetrachloride at 80° C., 3 hours' heating in chloroform at 65° C., 4 hours' heating in chlorobenzene at 80° C., preferably at 130° C., or 2 hours' heating in polyethylene glycol 6000 at 80° C.

To obtain dye preparations which are technically suitable for dyeing and printing, the β-modification according to the invention can be converted into a very finely divided form by the usual mechanical processes, optionally in the presence of water and of suitable dispersing agents and other customary additives. The normal type of devices, such as mills, for example ball mills, vibratory mills, sand mills or kneaders, can be used for the fine division of the β-modification optionally to be performed. Suitable dispersing agents are for example condensation products of mono- or polynuclear aromatic compounds, such as naphthalene, naphthols, phenols or sulfonic acids thereof, with formaldehyde or with other substances which can condense with aromatic rings, such as urea, ethylene oxide or isocyanates, optionally with the addition of sodium sulfite, also lignin sulfonates and nonionic or anionic, surface-active compounds.

The novel dye modification processed into a finely divided form is excellently suitable for dyeing synthetic and semi-synthetic textile materials, such as synthetic linear polyesters, for example polyethylene glycol terephthalate, or chemically analogously synthesised polymers, and semi-synthetic fibre materials, such as cellulose triacetate, at temperatures of about 100° to 220° C. Under dyeing conditions, the novel dye modification is stable in dispersion, and does not have the disadvantage of the conventionally obtainable unstable modification of the stated dye of giving rise, in dyeing processes in which the dye is exposed for a prolonged period in the aqueous medium to an elevated temperature, to dye flocculation and filtration effects, which frequently lead to unlevel dyeings with poor fastness to rubbing. In the case in particular of the dyeing of wound packages—for example cheeses—there is no occurrence of agglomerations, flocculation and finally filtration of the dye on the spools even when the dye liquor is only slowly exhausted or when dyeing is performed with such an excess of dye that an exhaustion of the dye bath never occurs. The novel dye modification is therefore excellently suitable particularly in machine dyeing for loose material and for the dyeing of spools or yarns.

Except where otherwise stated in the Examples which follow, the term 'parts' denotes parts by weight.

The X-ray diffraction pattern was taken with CuK-α-radiation (λ=1.5405 Å). The calibration substance used was α-quartz, the d values of which are calculated from a=4.913 Å and c=5.405 Å. The relative line intensities were estimated visually.

EXAMPLE 1

30 parts of press cake of the α-modification of the dye obtained by coupling diazotised 2-chloro-4-nitroaniline with 1-[N-(β-hydroxy-γ-phenoxy-propyl)-amino]-2-chloro-5-acetylamino-benzene are heated in a vacuum drying chamber for 10 hours at 100° to 110° C. until the weight remains constant. The dye, in this manner converted completely into the β-modification, produces, after being cooled and finely divided, a dispersion which is stable to dyeing and which is excellently suitable for dyeing textile material made from polyester. An equally good result is obtained when the crude dye is heated in the vacuum drying chamber for 10 hours at 140° to 145° C. until the weight is constant, the procedure otherwise being as described in the above Example.

EXAMPLE 2

30 parts of the dye of the α-modification, m.p. 132°–136° C., which has been obtained according to German Pat. No. 2,101,912 by coupling of diazotised 2-chloro-4-nitroaniline with 1-[N-(β-hydroxy-γ-phenoxypropyl)-amino]-2-chloro-5-acetylamino-benzene, and then dried at 40° to 50° C. in vacuo until the weight remained constant, are suspended in 900 ml of chlorobenzene, and the suspension is refluxed for 4 hours. After cooling, the dye, m.p. 170°–175° C., obtained in the stable β-modification, is filtered off and, after fine division of the dye, there is obtained a dispersion which is stable to dyeing and which yields level dyeings when used to dye polyester textile material in the customary manner. The dye is stable in the liquor under dyeing conditions, that is to say, it exhibits no crystal growth or other modifications of the individual grain.

EXAMPLE 3

10 parts of the β-modification of the dye stable to dyeing, produced according to Example 1, together with 5 parts of a condensation product of naphthalenesulfonic acid with formaldehyde in 60 parts of water, are ground by means of a glass-bead mill until an adequately fine division is obtained. There are subsequently added 15 parts of an oxylignin sulfonate, and the mixture is dried in a spray-drying apparatus.

In a pressure-dyeing apparatus, 40 g of the resulting dye dispersion are suspended in 40 liters of water at 70° C. containing 4 g of oleyl polyglycol ether. The pH value of the dye bath is adjusted with acetic acid to 4 to 5. A wound package consisting of 2000 g of polyethylene glycol terephthalate yarn is then dyed therewith by raising the temperature of the dye bath within 30 minutes from 70° to 130° C. and holding the bath at this temperature for 50 minutes. There is obtained after the customary finishing of the dyeing a wound package which is evenly dyed red and which displays no staining or deposits of dye.

When 10 parts of the α-modification of the dye obtained according to Example 1, which is unstable to dyeing, are used, the procedure otherwise being as described in the above Example, the resulting red dyeing is uneven, not fast to rubbing, and hence unusable, and there are moreover deposits of dye on the surface of the dyed material.

What is claimed is:

1. A modification of the azo dye of the formula

Figure 1:
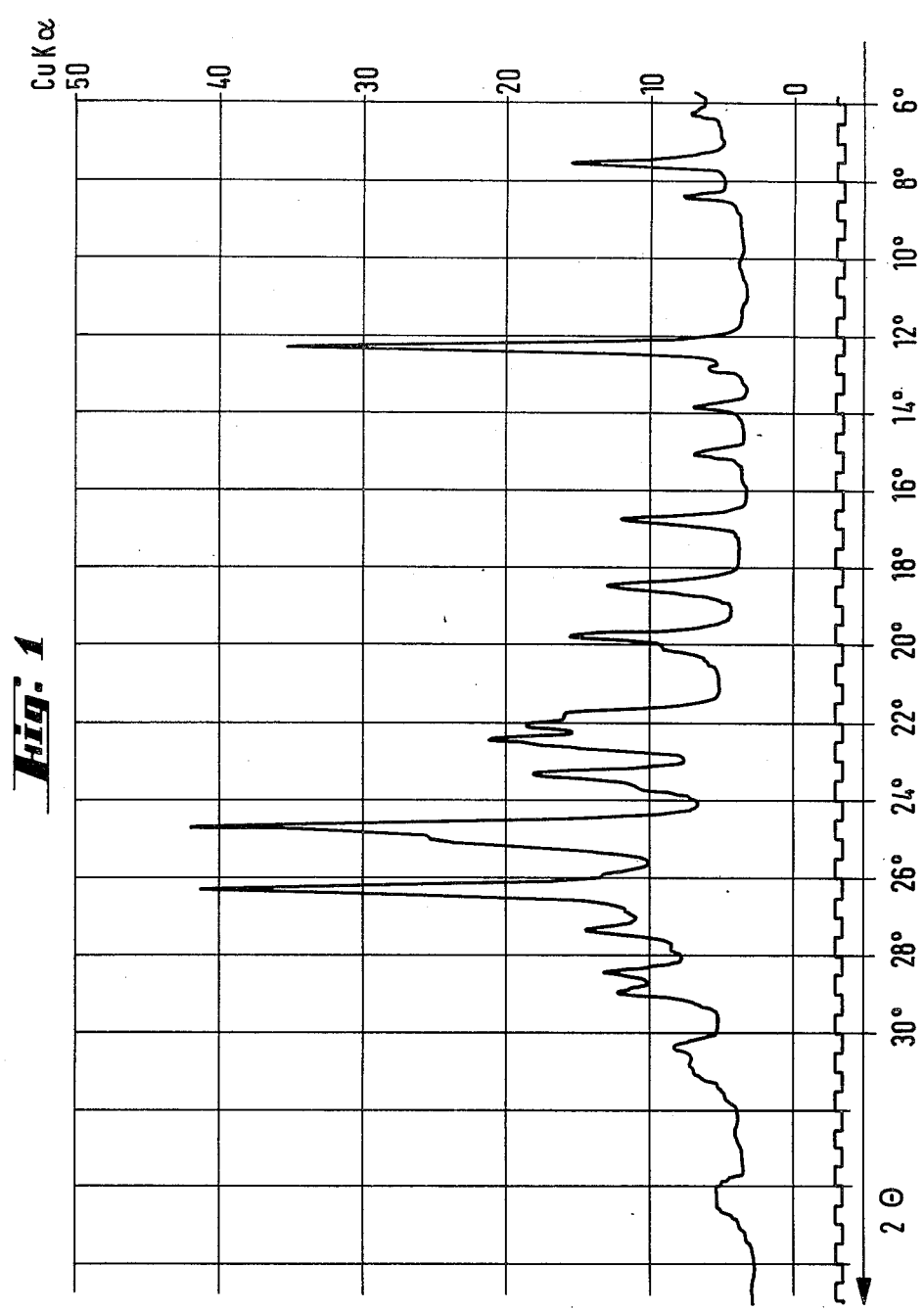

which modification is stable to dyeing and which is characterised by the X-ray diffraction pattern (CuK-α radiation) with the characteristic reflexes shown in FIG. 1, and by the d values of the interplanar spacings, calculated from the diffraction pattern:

d [Å]: 11.9 (s), 7.2 (vs), 3.61 (vs) and 3.39 (vs).

2. A process for producing the β-modification stable to dyeing of the azo dye according to claim 1, wherein the α-modification of the dye of the given formula, which modification is unstable to dyeing, and which is characterised by the X-ray diffraction pattern with the characteristic reflexes shown in FIG. 2, and by the following d values of the interplanar spacings:

d [Å]: 9.5 (s), 7.9 (s), 5.10 (s), 5.00 (s), 3.79 (vs), 3.48 (s), 3.34 (s) and 3.19 (s), is heated for 0.5 to 20 hours at a temperature of between 65° and 200° C.

3. A process according to claim 2, wherein the solid dye of the α-modification is used as starting material and is heated for 4 to 12 hours at a temperature of between 100° and 170° C.

4. A process according to claim 2, wherein the dye of the given formula, which is unstable to dyeing, is heated in the form of a suspension in an organic solvent, optionally under pressure, for 0.5 to 5 hours at a temperature of between 90° and 140° C.

5. A process according to claim 4, wherein the organic solvent used is an aromatic solvent having a boiling range of 70° to 220° C.

6. A process for dyeing synthetic or semi-synthetic fibre material by application of the β-modification of the azo dye according to claim 1, which modification is stable to dyeing.

7. The process of claim 5, wherein the organic solvent is chlorobenzene.

* * * * *